(12) United States Patent
Lingua et al.

(10) Patent No.: US 6,904,332 B2
(45) Date of Patent: Jun. 7, 2005

(54) SUPERVISOR FOR A HOLLOW GLASSWARE PRODUCTION LINE

(75) Inventors: Terenzio Lingua, Cuneo (IT); Giovanni La Carrubba, Cuneo (IT); Corrado Ghinamo, Boves (IT)

(73) Assignee: Bottero S.p.A., Cuneo (IT)

( * ) Notice: Subject to any disclaimer, the term of this patent is extended or adjusted under 35 U.S.C. 154(b) by 678 days.

(21) Appl. No.: 09/949,941

(22) Filed: Sep. 12, 2001

(65) Prior Publication Data

US 2002/0035409 A1 Mar. 21, 2002

(30) Foreign Application Priority Data

Sep. 12, 2000 (IT) .................................... TO2000A0859

(51) Int. Cl.[7] .......................... H01L 21/66; G06F 19/00
(52) U.S. Cl. .................. 700/157; 700/157; 700/158; 700/95; 700/96; 700/97; 700/100; 65/158; 65/160
(58) Field of Search .................... 700/95–97, 100, 700/157, 158; 65/158, 160

(56) References Cited

U.S. PATENT DOCUMENTS

| | | | | |
|---|---|---|---|---|
| 4,641,269 A | * | 2/1987 | Japenga et al. | 700/158 |
| 4,827,423 A | * | 5/1989 | Beasley et al. | 700/96 |
| 5,345,389 A | * | 9/1994 | Calvin et al. | 700/158 |
| 5,445,662 A | * | 8/1995 | Peterson et al. | 65/158 |
| 5,609,663 A | * | 3/1997 | Nguyen et al. | 65/160 |
| 5,694,325 A | | 12/1997 | Fukuda et al. | |
| 5,777,876 A | * | 7/1998 | Beauchesne | 700/95 |
| 6,078,320 A | * | 6/2000 | Dove et al. | 345/866 |
| 6,400,999 B1 | * | 6/2002 | Kashiyama et al. | 700/100 |
| 6,490,493 B1 | * | 12/2002 | Dharnipragada | 700/97 |
| 6,497,119 B1 | * | 12/2002 | Hartel et al. | 65/29.14 |
| 6,722,158 B2 | * | 4/2004 | Simon | 65/29.11 |

FOREIGN PATENT DOCUMENTS

| | | |
|---|---|---|
| EP | 0 331 478 | 9/1989 |
| EP | 0 641 467 | 3/1995 |
| EP | 0 740 241 | 10/1996 |
| WO | WO 91/06050 | 5/1991 |
| WO | WO 93/21593 | 10/1993 |

\* cited by examiner

*Primary Examiner*—Leo Picard
*Assistant Examiner*—Michael D. Masinick
(74) *Attorney, Agent, or Firm*—Oblon, Spivak, McClelland, Maier & Neustadt, P.C.

(57) ABSTRACT

The supervisor is connected to at least one hollow glassware production line including a plurality of controlled moving members, and is defined by a line agent unit generating a virtual image of the line, a database memorizing all the data required for operation of the line, an interface, and an instruction analyzer. The database is defined by individual memory areas separately memorizing data relative to the structure of each line in a line table; data relative to production processes to be performed in a process table; and specific elementary operation instructions for the line members by means of a recipe table memorizing conditions relating the memorized lines and production processes. The instruction analyzer processes the line structure data and production process data, and generates specific instructions on the basis of the entered data.

15 Claims, 8 Drawing Sheets

| Name | Description | Type | Class | Value type | Range | Step | Default | Role |
|---|---|---|---|---|---|---|---|---|
| Cavity | Number of cavities | Config. | Static | Whole | 1÷4 | 1 | 2 | Cavity |
| Open finish mold in advance | Open finish mold in advance | Standard | Static | Boolean | - | - | True | - |
| ... | ... | ... | ... | ... | ... | ... | ... | ... |

| Name | Description |
|---|---|
| Process X | Method X process |
| Process Y | Method Y process |
| ... | ... |

| Name | Description | Direction | Sections | Language | Screen saver | Screen saver time | Hole management | Systems present |
|---|---|---|---|---|---|---|---|---|
| L-B1 | Line B1 | Left | 10 | Italian | Yes | 1 | No | Timing, Gob, Drive, Pusher |
| L-B2 | Line B2 | Right | 8+8 | German | No | - | No | Timing, Pusher |
| ... | | | | | | | | |

Fig. 10

| Name | Description | Process | Line | Ware |
|---|---|---|---|---|
| Recipe B1 | Line L-B1 recipe | Process X | L-B1 | Mineral water |
| Recipe B2 | Line L-B2 recipe | Process Y | L-B2 | Fruit juice |
| ... | | | | |

Fig. 11

SUPERVISOR FOR A HOLLOW GLASSWARE PRODUCTION LINE

The present invention relates to a supervisor for a hollow glassware production line.

BACKGROUND OF THE INVENTION

As is known, a hollow glassware production line comprises a plurality of sections (normally six to twelve) for simultaneously producing the same or different ware; and each line comprises a large number of moving members (some shared by all the sections, and others forming part of a specific section) which are each activated by an electric or pneumatic actuator and must therefore be synchronized with one another. Operation of the moving members of each line is therefore controlled on the basis of a production plan (or so-called "recipe") which depends on the type of ware being produced, the type of process employed by each section, and the specific section in which the ware is produced.

More specifically, for each product type, the characteristics of the line (e.g. structure, mechanism characteristics and distances, event sequence and timing) must be known in detail and related to the specific product.

At present, when setting up a new line, reconfiguring an existing line, or making production changeovers, all the line operating data is entered and memorized in a new recipe; and any alteration, even to only one of the above production parameters (e.g. the physical connection between a control system output and a specific actuator, or changeover in production), means resetting the entire recipe. Moreover, an existing recipe for one line cannot be used for a new one.

Drawing up a new recipe each time therefore involves considerable cost, as well as considerable downtime in the case of emergency intervention on a working line.

To monitor the operation, any emergency stops and restarting of each line, a supervisor, even remote, has recently been proposed to simplify line data loading, operation monitoring, and emergency intervention by the operator.

SUMMARY OF THE INVENTION

It is an object of the present invention to provide a supervisory system for simplifying the preparation of new recipes when setting up new lines and/or making production changeovers, or when making alterations to existing settings; guiding the operator when entering specific line and production data; making changes to existing recipes to accommodate new settings; optimizing settings on the basis of existing conditions; making dynamic setting corrections, while the line is running, to accommodate any event; saving the last configuration when making production changeovers; and reloading a previous configuration when switching back to a previous production.

According to the present invention, there is provided a supervisor for a hollow glassware production line, connected to data and information input/output units and to at least one hollow glassware production line comprising a plurality of controlled moving members, characterized by a processing unit and a memory unit, said memory unit comprising individual memory areas separately memorizing structural data relative to the structure of each of said lines and production process data relative to production processes to be performed; and said processing unit comprising means for processing said structural and production process data, and means for generating a specific recipe for a said line on the basis of said data.

BRIEF DESCRIPTION OF THE DRAWINGS

A non-limiting embodiment of the invention will be described by way of example with reference to the accompanying drawings, in which:

FIGS. 5–11 show tables used by the supervisor according to the present invention;

DETAILED DESCRIPTION OF THE INVENTION

Figure 1:
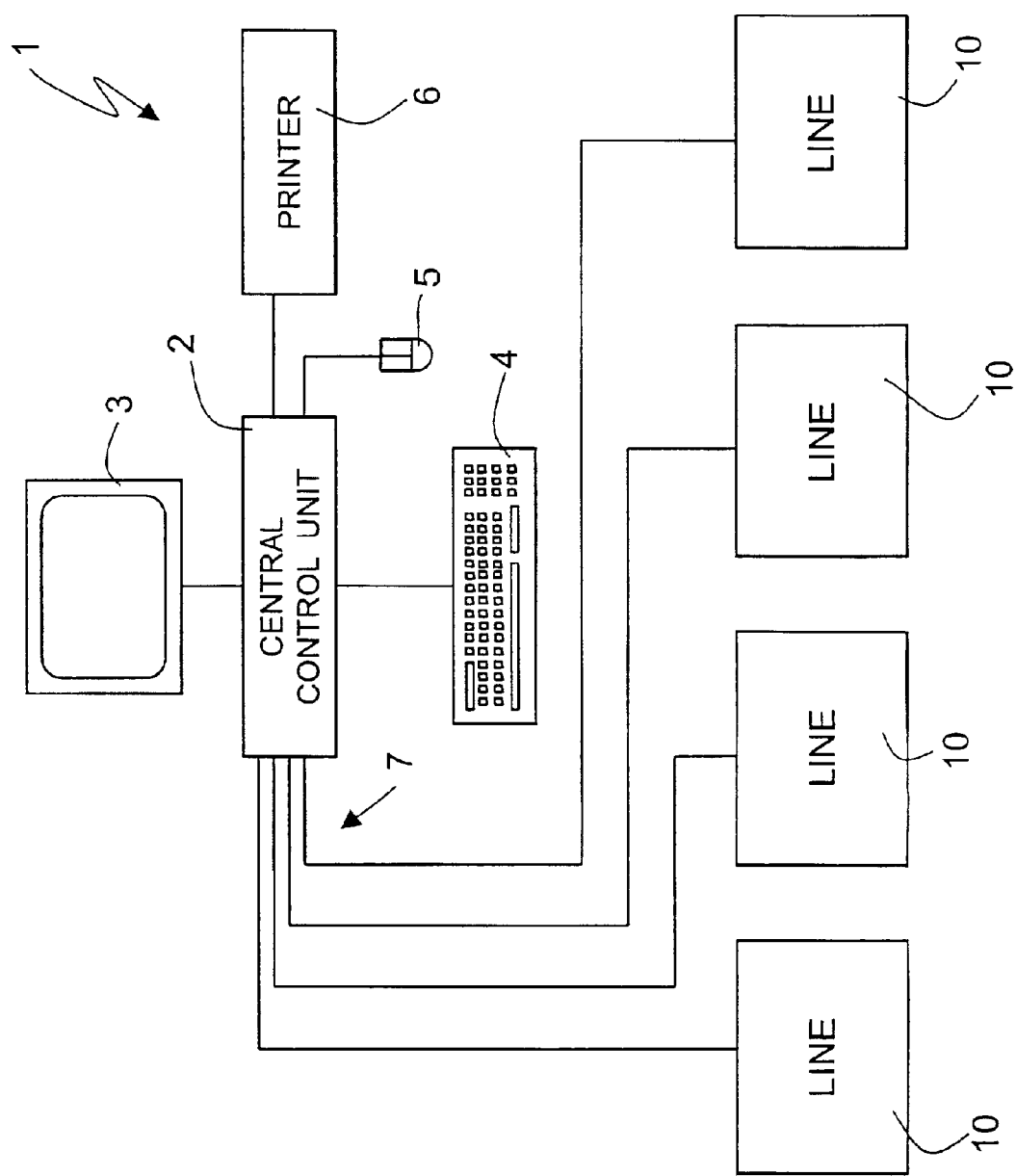
FIG. 1 shows an overall block diagram of the supervisor, and connection to various hollow glassware production lines.

Number 1 in FIG. 1 indicates a system for producing hollow glassware and comprising a central control unit 2 implementing a supervisor and connected to peripheral units, of which FIG. 1 shows a video unit 3, a keyboard 4, a mouse 5, and a printer 6.

Central control unit 2 is connected over an electric network 7, e.g. an Ethernet network (registered trademark), to a plurality of hollow glassware production lines 10.

Figure 2:
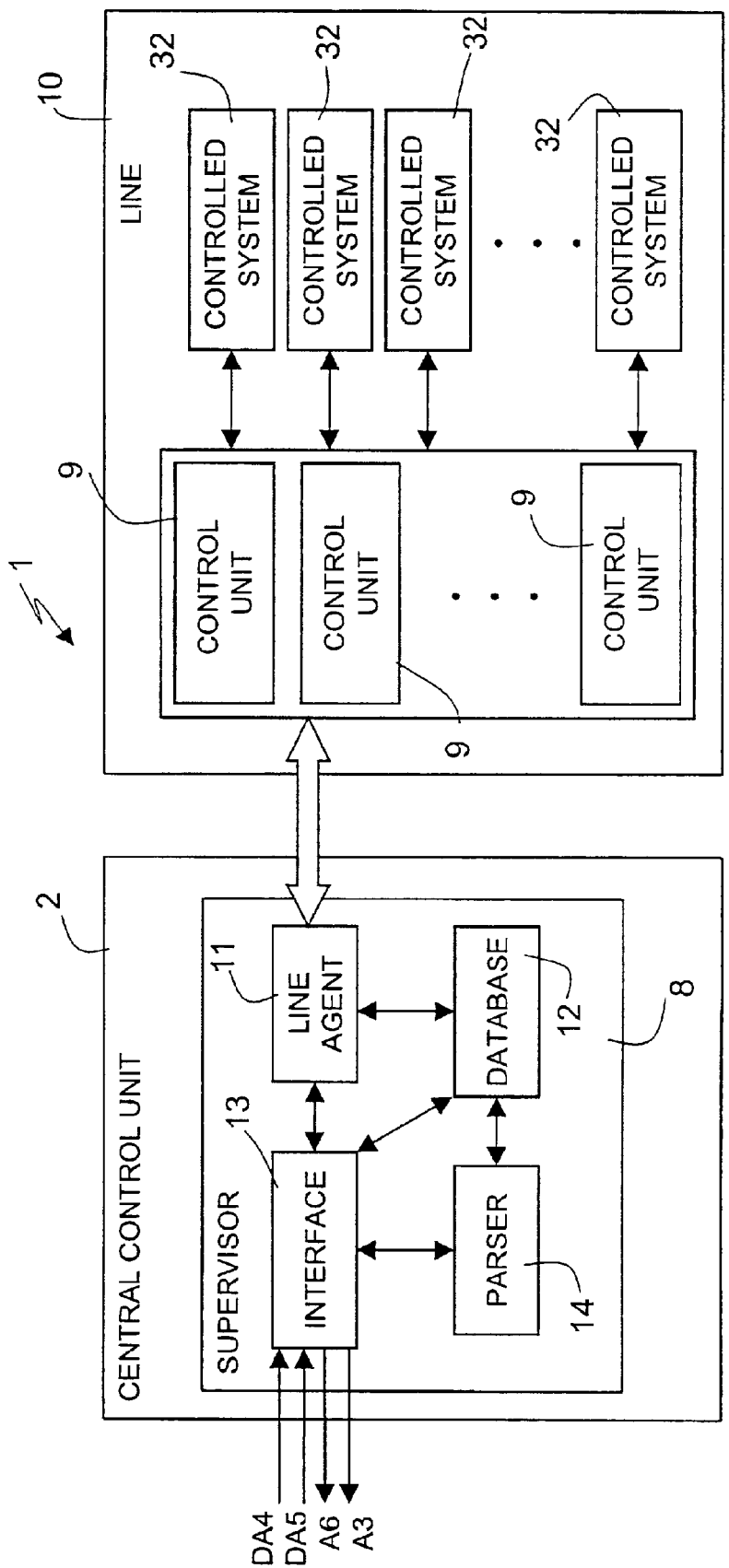
FIG. 2 shows a block diagram of part of FIG. 1.

As shown in simplified manner in FIG. 2, central control unit 2 includes a supervisor 8 or main controller connected to one or more lines 10 (only one shown in FIG. 2 for the sake of simplicity), each of which includes a plurality of control units 9 (e.g. four) connected to a plurality of controlled systems 32.

Supervisor 8 is defined by a plurality of software modules including a line agent 11, which generates a virtual representation of a specific line 10 (a plurality of line agents 11 are therefore required in the event of multiple line control by the same supervisor 8). Line agent 11 handles all communication with respective control units 9, and is connected to a memory unit including a database 12, in which all the necessary line 10 operating data is memorized (as described in detail later on), and to an interface 13 in turn connected to database 12 and to a parser 14 also connected to database 12.

Figure 3:
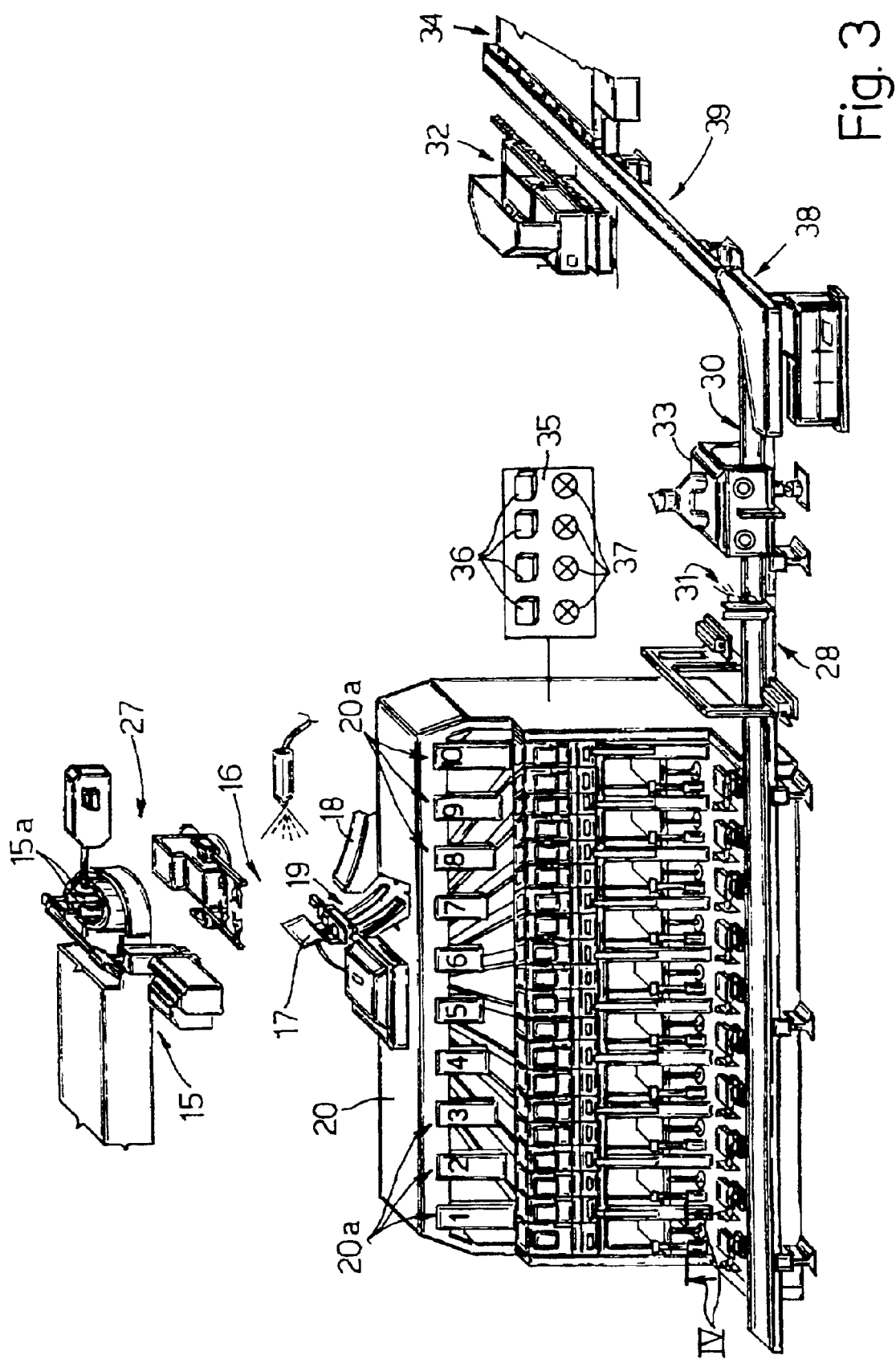
FIG. 3 shows a simplified diagram of a hollow glassware production line.
Figures 4, 13:
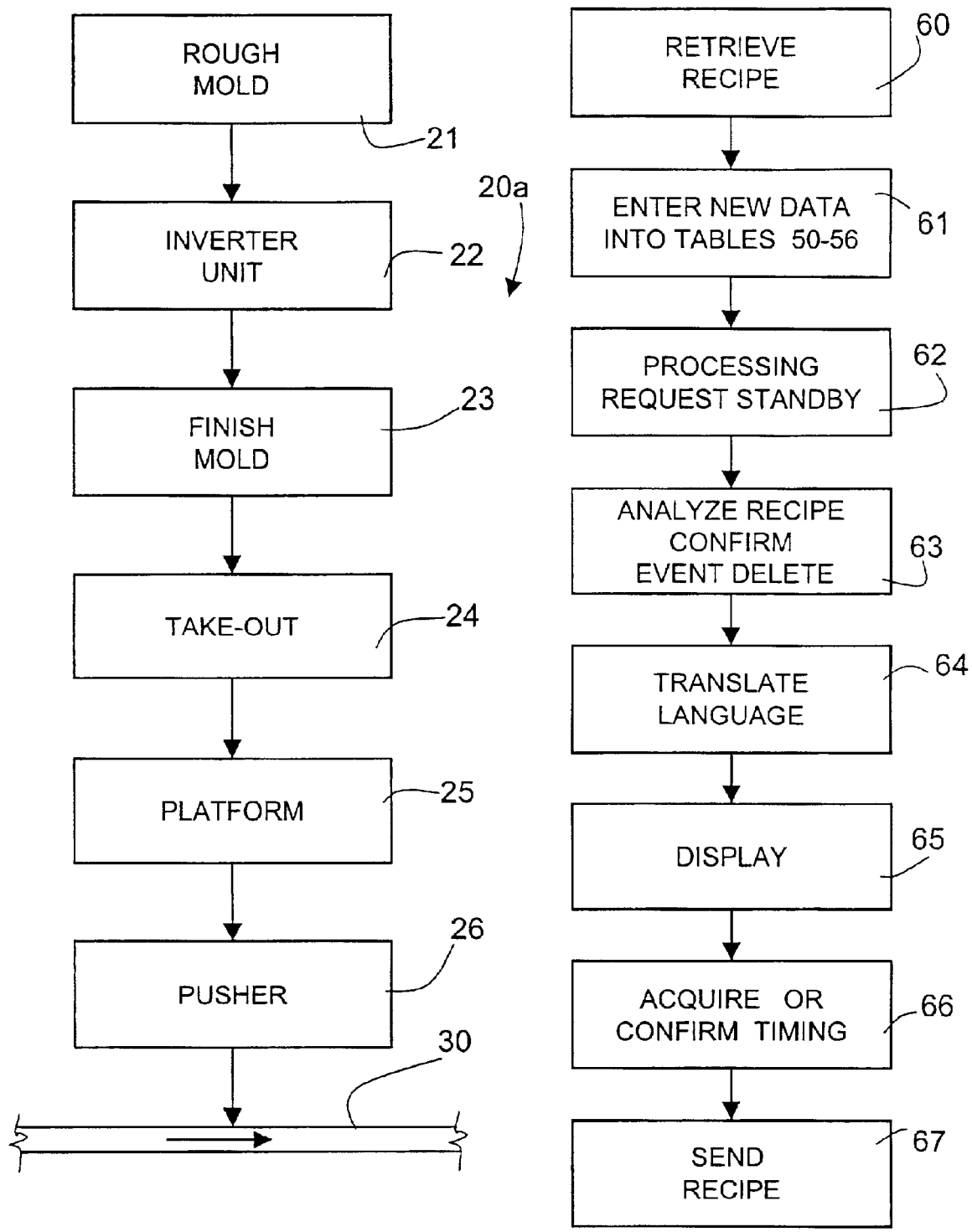
FIG. 4 shows a cross section along line IV—IV in FIG. 3.
FIGS. 12 and 13 show two flow charts of the recipe-generating method implemented by the supervisor according to the invention.

A simplified line 10 is shown in FIGS. 3 and 4 and described below relative to the members whose operation is set and checked by supervisor 8.

More specifically, line 10 comprises:

a glass gob feed assembly 27;

an I.S. machine 20 defined by a plurality of sections 20a for ware molding, arranged in parallel; and a ware unloading and checking assembly 28.

Glass gob feed assembly 27 comprises a molten glass feeder 15 connected to two punches 15a moving back and forth linearly to push the molten glass and form two glass beads; a scissor assembly 16 for cutting the glass beads into individual gobs; a plate 17 movable between a noninterference rest position and an intercepting work position in which it diverts the glass gobs away from the underlying members to an unloading channel 18, e.g. for cleaning; and a distributor 19 rotating in a given sequence to guide each glass gob to a given section underneath.

Each section 20a of I.S. machine 20 (the component parts of which are shown schematically in FIG. 4) comprises a rough mold 21 movable between an open and a closed position, receiving one glass gob at a time, and producing a semifinished glass article from each gob; an inverter unit 22, which grips the semifinished article and turns it over into a finish mold 23, also movable between an open and a closed position, and in which the hollow glass article is completed; a take-out device 24, which removes the finished ware from the finish mold and transfers it onto a fixed platform 25; and a pusher 26 for transferring the finished ware to ware unloading and checking assembly 28.

Ware unloading and checking assembly 28 is defined by a conveyor belt 30, which extends from the frame of I.S. machine 20 to a collecting section, and along which are installed various ware checking units, such as: an ejector 31 for removing any failed ware off the belt; a surface treating hood 33; a ware transfer unit 38 for transferring the wares onto a tempering conveyor belt 39; and a stacker 32 for loading the wares into an annealing furnace 34.

For each section 20a, the I.S. machine 20 frame is fitted with two panels 35 (only one shown schematically) having a plurality of buttons 36 and indicator lights 37 relating to particular operating stages of the respective section. Buttons 36 can be operated by a technician, e.g. to stop section 20a in an emergency, and each correspond to a respective indicator light 37.

The above members (feeder 15, scissor assembly 16, plate 17, distributor 19, rough mold 21, finish mold 23, inverter unit 22, take-out device 24, pusher 26, conveyor belt 30, ejector 31, members 18, 33, 38, 39, 32, 34) are controlled, in known manner not shown in detail, by respective actuators defined by respective electric or pneumatic motors. These actuators, which form, together with the respective members, the controlled systems 32 of FIG. 2, are controlled according to the processes to be implemented by line 10, as specified by a recipe memorized in database 12 of supervisor 8.

According to the invention, supervisor 8 processes new recipes or modifies previous recipes, when requested, using a plurality of tables storing the necessary line, process and recipe-related product data. These tables, forming database 12, are stored or modified whenever necessary and combined with one another to define a specific production, including the timing the various members.

Figure 5:
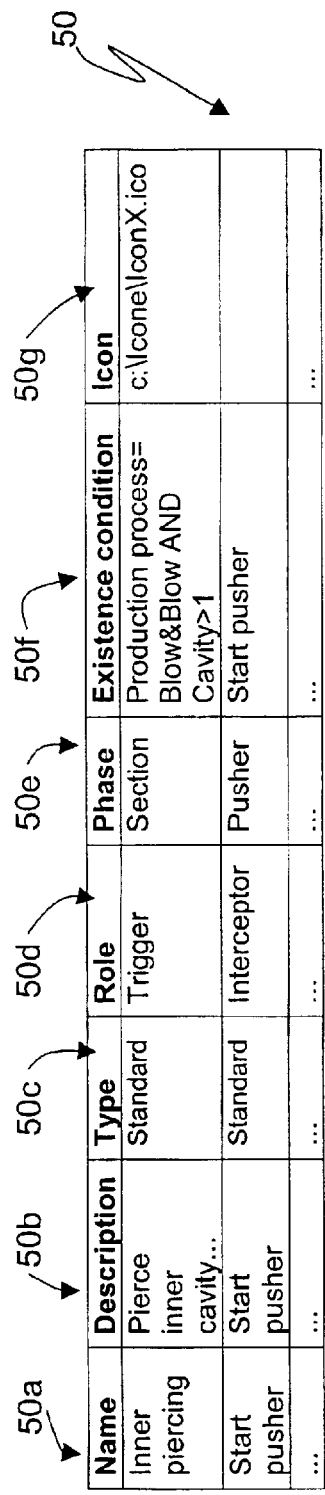
Figure 6:
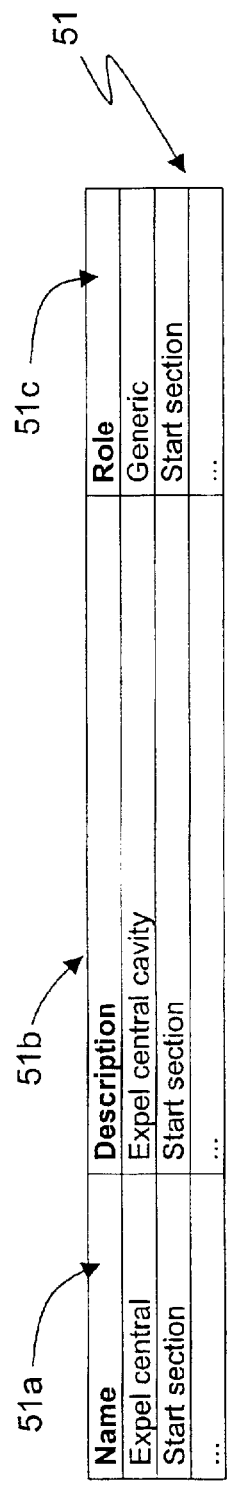
Figure 7:
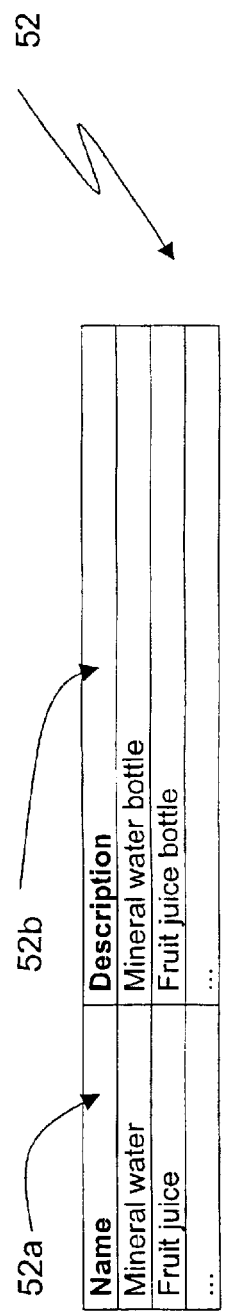
Figure 8:
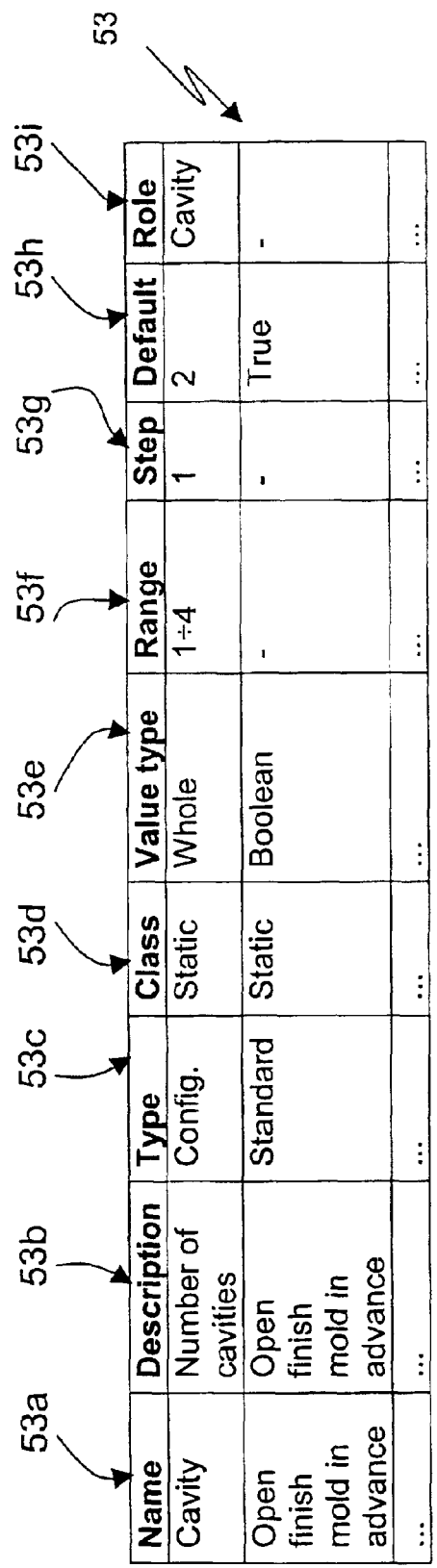
Figure 9:
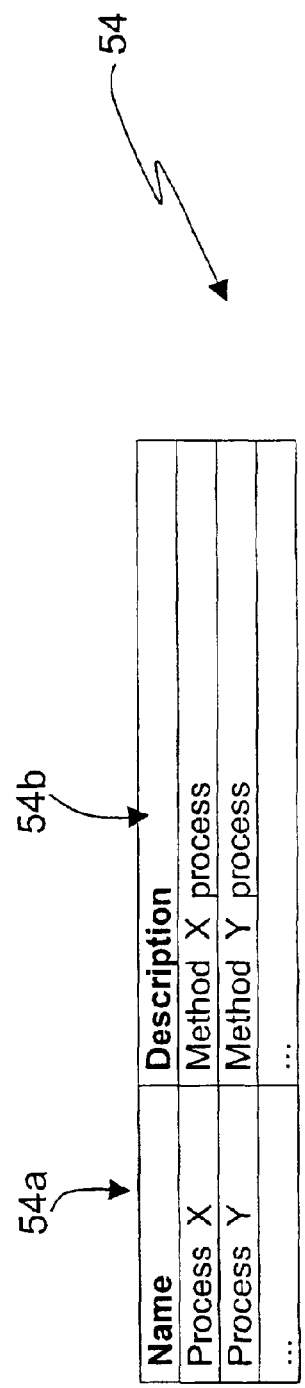

More specifically, supervisor 8 according to the invention employs the following tables stored in a memory area of the memory unit:

event table 50 (structured as shown in FIG. 5);
button table 51 (FIG. 6);
ware table 52 (FIG. 7);
variables table 53 (FIG. 8);
process table 54 (FIG. 9);
line table 55 (FIG. 10);
recipe table 56 (FIG. 11).

As shown in FIG. 5, event table 50 memorizes all the events necessary for correct operation of a given line, i.e. all the actions or functions performed by the various members at the sections, e.g. opening/closing the molds; operation of the inverting unit; operation of the pusher.

Event table 50 is defined by a plurality of rows, each relating to a respective event and comprising the following fields: a name field 50a memorizing the name of each event (in the example shown, two events are memorized: an inner-piercing event, relative to piercing of the neck portion of the semifinished article in the rough mold to facilitate air injection in the finish mold, and performed by a member with a respective pneumatic actuator; and a start-pusher event); a description field 50b memorizing a brief description of the event; a type field 50c memorizing the type of event, and specifically whether it is standard or additional; a role field 50d, which memorizes whether the event is generic, noncritical or related to critical functions/members of line 10; a phase field 50e memorizing which part of the line the event relates to in terms of timing; an existence condition field 50f, which memorizes whether the event is always present (in which case, the field is blank) or depends on particular conditions, such as the performance or not of a specific process operation, or the occurrence of a predetermined condition; and an icon field 50g memorizing the relative icon address.

Button table 51 (FIG. 6) memorizes all the buttons and indicator lights on panel 35, as necessary for operation. Button table 51 is divided into the following fields: a name field 51a, a description field 51b, and a role field 51c similar to fields 50a, 50b and 50d in the event table.

Ware table 52 (FIG. 7) lists all the articles that can be produced on a given line 10, and is divided into the following fields: a name field 52a and a description field 52b.

Variables table 53 (FIG. 8) lists all the variables involved in the operation of a given line 10, i.e. all the conditions, situations or quantities varying from one line to another or within the same line in the course of the production sequence. Such variables may therefore depend on external situations, on the configuration of the line, or on the specific way in which the line operates. Variables table 53 is divided into the following fields: a name field 53a; a description field 53b; a type field 53c indicating whether the variable is standard (e.g. the possibility of the finish mold opening in advance), is additional (e.g. the type of cooling unit), or is a configuration variable (e.g. the number of mold cavities); a class field 53d indicating whether the variable is dynamic (varies during operation of the line), static (of known value when the recipe is sent to the respective line), or a system variable (only detectable by the line, e.g. the presence of a glass gob downstream from plate 17); a value type field 53e indicating whether the variable is whole or boolean; a range field 53f indicating the range of possible variable values (e.g. in the case of mold cavities, the possibility of these ranging from 1 to 4); a step field 53g indicating the possible increment in the variable value within the range shown in range field 53f; a default field 53h memorizing the default value of the variable; and a role field 53i memorizing the member or part of the line to which the variable relates.

Process table 54 (FIG. 9) contains a detailed list of all the production processes involved in the operation of a given line 10, and comprises a name field 54a and a description field 54b.

Process table 54 is assigned a plurality of tables (not shown) regarding:

a process function table indicating the functions included in a specific process, and comprising the following fields: name; description; existence conditions; function instruction sequence; function instruction issues, expressions and conditions;

a trigger event table indicating events triggering specific phases in the process, and comprising the following fields: name; description; phase; relative icon address;

a son event table indicating events related to a "father" event, and comprising the following fields: name; description; father event; icon;

an event group table memorizing the relationship between different events, and comprising the following fields: name of each group; description; list of related events in the group; relationship with other events in the same group; and a safety relationship table memorizing compulsory safety conditions, such as the presence/absence of a related event for a given event to be performed, and comprising the following fields: master event name; slave event name; master event relationship (on/off); slave event relationship (on/off).

Line table 55 (FIG. 10) memorizes a list of all the lines in a given plant, and comprises the following fields: a name field 55*a* indicating the conventional name of each line; a description field 55*b*; a direction field 55*c* indicating the ware traveling direction (right/left) on the conveyor belt; a section field 55*d* indicating the number of sections in the line; a language field 55*e* indicating the language in which user messages are generated; a screen saver field 55*f* indicating the presence or absence of a screen saver; a screen saver time field 55*g*; a bottle hole management field 55*h*; a system field 55*i* indicating the names of the members, units and systems on the given line.

Line table 55 is assigned the following tables:

a system table indicating advanced-configuration data of the various systems (timing, pusher, etc.) on the line;

a defined-event table indicating defined events actually possible on a given line; such events represent a subset of the events listed in event table 50, and for each the following data is supplied: name; type (additional/standard); relative physical output; on and off values; type of valve involved;

a setup table indicating overall machine setup data, i.e. data independent of the particular ware being produced;

a redefined-variable table listing the actually existing variables or defining the actual characteristics thereof (e.g. variability) on the line considered. The redefined variables are therefore a subset of the variables in table 53, and for each the following data is supplied: the extent to which the variable value can be modified when creating a recipe; default value; range of possible values (minimum and maximum); and default value section by section.

Recipe table 56 (FIG. 11) combines all the information memorized in the previous tables to define specific recipes, and comprises the following fields: a name field 56*a*; a description field 56*b*; a process field 56*c*; a line field 56*d*; and a ware field 56*e*. More specifically, the process, line and ware fields memorize the names of the specific process, line and ware of the recipe considered, so that reference to a particular recipe of, say, name B1 supplies a cross reference to the information memorized in process, line and ware tables 54, 55 and 52 in the row corresponding to the specific process, line and ware memorized in recipe table 56. Since process, line and ware tables 54, 55 and 52 are in turn connected to all the other tables, all the information required for a given production is thus interrelated to create a new recipe.

Figure 12:
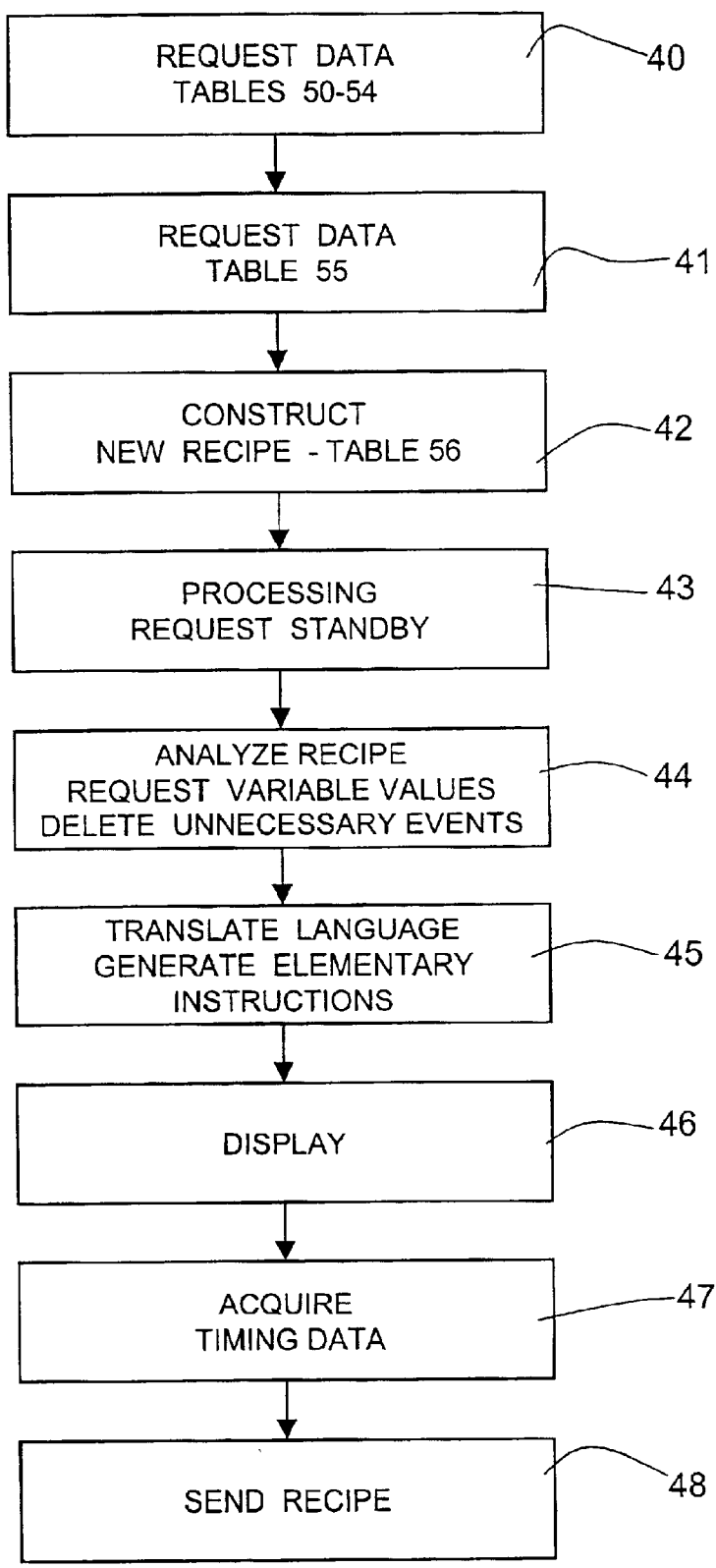

Consequently, as shown in the FIG. 12 flow chart (step 40), to create a new recipe, supervisor 8 requests from the user, in succession, the data relative to event table 50, button table 51, ware table 52, variables table 53, process table 54 and associated tables, and memorizes it in the respective tables. More specifically, to construct the son event table, the event group table and the safety relationship table associated with process table 54, supervisor 8 determines whether the variables and events specified are already memorized in variables tables 53 and event table 50, and prohibits entry if the variables and events have not already been defined at a general level.

At this stage, the data entered is still of a general nature and does not yet relate to a particular line.

Supervisor 8 (step 41) then requests from the user the data relative to line table 55 and associated tables, including setting and setup data and system events and variables. At this stage, supervisor 8 only allows selection of the variables and events predefined and memorized respectively in variables table 53 and event table 50; and the entered data is then memorized in line table 55.

At this stage, the entered data is relates to a specific line.

Supervisor 8 (step 42) then asks the user to construct a new recipe, and to assign to a particular line the data relative to a particular process and to the ware to be manufactured. That is, this stage defines, unequivocally, the type of ware, and how and on what machinery it is to be manufactured, and the information is memorized in a blank row in recipe table 56.

Supervisor 8 (step 43) then waits for a user request to process the newly memorized recipe.

On receiving the request (step 44), supervisor 8 analyzes the newly memorized recipe by displaying on display 3 of FIG. 1 the variables involving a value selection by the user (e.g. type of mold cooling), and by eliminating any elements (e.g. events, functions, etc.) extraneous to the specific recipe.

Supervisor 8 (step 45) then analyzes the newly memorized recipe to translate all the instructions into the lowest-level language readable by the timing system. At this stage, using instruction analyzer 14, each static expression is resolved, the code not required for the specific recipe is eliminated entirely, and instruction analyzer 14 generates specific elementary operation instruction sequences for the members of line 10.

A synoptic image of the actual line is then displayed (step 46), and supervisor 8 requests and acquires the exact timing data for all the actuating members (step 47), and, when instructed by the user, sends the processed recipe to the line (step 48).

Supervisor 8 thus combines the line, process and ware information to generate new recipes.

Furthermore, when it is necessary to modify only a few data items of an existing recipe, this can be done easily and a new recipe constructed by modifying an existing one as shown by way of example in FIG. 13. More specifically, the user first activates a routine to retrieve the memorized recipe to be modified (step 60); and then replaces the corresponding previous data to be updated (step 61). It is possible to modify even only one data item, e.g. the type of ware for manufacture, in tables 50–56, and memorize the new recipe name and the association with respective line table 55, process table 54 and wear table 52 in table 56. Supervisor 8 then waits for a request to process the recipe (step 62), and, when requested by the user, activates the steps for processing the recipe and the subsequent operation of requesting the values of some variables, eliminating any unnecessary events, translation into machine language, display and sending the recipe to line 10 (steps 63–67) as in steps 44–48 to generate a new recipe. Advantageously, during the processing stage, after displaying the synoptic image of the line (step 65), the supervisor requests whether the timing data already memorized for the previous recipe is to be used. If so, the supervisor uses the previous timing data, automatically deletes the timing data relative to nonexisting events, and modifies the previous timing data, if necessary, to enter the new-event data (step 66).

When any changes are made to the line, process or ware, the user therefore simply enters any data differing with respect to a previously memorized recipe, and supervisor 8 provides for processing an appropriate new recipe.

The processed and memorized recipes are identified by specific names, so that, when necessary, a previous recipe can be retrieved and used again with no alterations. More specifically, in the case of one or more lines for producing different wares at different times, e.g. in seasonal cycles, temporarily discarded memorized recipes may be used again without processing them from zero.

Moreover, if the line has to be stopped, to make minor technical alterations, and then started up immediately, this can be done quickly and the interrupted recipe adapted to the alterations made, with far less downtime than would be involved in processing an entirely new recipe from zero.

Clearly, changes may be made to the supervisor as described herein without, however, departing from the scope of the present invention.

What is claimed is:

1. A main controller for a hollow glassware production line, connected to data and information input/output units and to at least one hollow glassware production line comprising a plurality of controlled moving members the main controller comprising:
   a processing unit; and
   a memory unit comprising individual memory areas separately memorizing structural data relative to the structure of the at least one hollow glassware production line and production process data relative to production processes to be performed;
   wherein the processing unit comprises means for processing said structural and production process data, and means for generating a specific recipe for the at least one hollow glassware production line on the basis of said data.

2. The main controller as claimed in claim 1, wherein said memory unit comprises:
   a line table memorizing said structural data relative to the structure of the at least one hollow glassware production line;
   a process table memorizing said production process data; and
   a recipe table memorizing conditions associating at least one of said at least one hollow glassware production line and one of said processes.

3. The main controller as claimed in claim 2, wherein said line table comprises a plurality of subareas including, for the at least one hollow glassware production line, a line name field, and a members-present field indicating the members present on the at least one hollow glassware production line.

4. The main controller as claimed in claim 2, wherein said line table is associated with further tables memorizing data relative to said members present on the at least one hollow glassware production line, data relative to defined events on the at least one hollow glassware production line, machine setup data, and data relative to defined variables on the at least one hollow glassware production line;
   and said processing unit comprises means for generating specific elementary operation instructions for the members on the at least one hollow glassware production line.

5. The main controller as claimed in claim 2, wherein said process table comprises a plurality of subareas including a process name field for each said process.

6. The main controller as claimed in claim 5, wherein said process table is associated with further tables memorizing data relative to functions performed in each of said processes; existence conditions of said functions; elementary instruction sequences implementing said functions; data relative to specific events of each process; and information on existing relationships between said events.

7. The main controller as claimed in claim 2, wherein said memory unit comprises a ware table memorizing a list of articles to be produced on the at least one hollow glassware production line;
   and said processing unit comprises means for relating said structural data, said production process data and said instructions to said list of articles.

8. The main controller as claimed in claim 2, wherein said memory unit comprises an event table memorizing a list of a plurality of general events;
   and said processing unit comprises means for relating a subgroup of said general events to said line table.

9. The main controller as claimed in claim 8, wherein said event table comprises a plurality of subareas including, for each said event, an event name field, an event type field, a role field indicating information relative to a nature of said event, a phase field indicating the relationship of said event to one of a plurality of timing systems on the at least one hollow glassware production line, and an existence condition field indicating existence conditions of said event.

10. The main controller as claimed in claim 2, wherein said memory unit comprises a button table including a list of buttons and indicators present on the at least one hollow glassware production line, and data relating to associated operations on the at least one hollow glassware production line.

11. The main controller as claimed in claim 10, wherein said button table comprises a plurality of subareas including, for each button or indicator, at least one button or indicator name field, and a role field indicating the nature of said button or indicator.

12. The main controller as claimed in claim 2, wherein said memory unit comprises a variables table having a list of generic variables;
   and said processing unit comprises means for relating a subgroup of said generic variables to said line table.

13. The main controller as claimed in claim 12, wherein said variables table comprises a plurality of subareas including, for each variable, at least a variable name field, a type field indicating a type of variable, a variability condition field, variability value fields, a default value field, and a role field indicating the relationship of said variable to a part of the at least one hollow glassware production line.

14. The main controller as claimed in claim 1, wherein said processing unit comprises:
   means for requesting said data relative to the structure of a predetermined one of the at least one hollow glassware production line and to a predetermined production process, and data relative to events to be performed or monitored;
   means for relating said data relative to the structure of said predetermined one of the at least one hollow glassware production line and to said predetermined production process;
   means for requesting the values of variables relative to said predetermined production process, and for selecting events compatible with said predetermined production process;
   means for acquiring timing data; and
   means for memorizing a recipe including said instructions.

15. The main controller as claimed in claim 14, wherein said processing unit comprises:
   instruction-modifying means comprising means for reading at least one of said individual memory areas, means for acquiring new data, means for selectively substituting said new data for data memorized in at least one of said individual memory areas, means for reprocessing said instructions on the basis of said new data, means for modifying timing data on the basis of said reprocessed instructions, and means for memorizing a new recipe.

* * * * *